March 23, 1926.
W. N. RIEGER
1,577,591
METHOD OF FORMING PIPE COUPLINGS AND THE LIKE
Filed Dec. 16, 1922
2 Sheets-Sheet 1
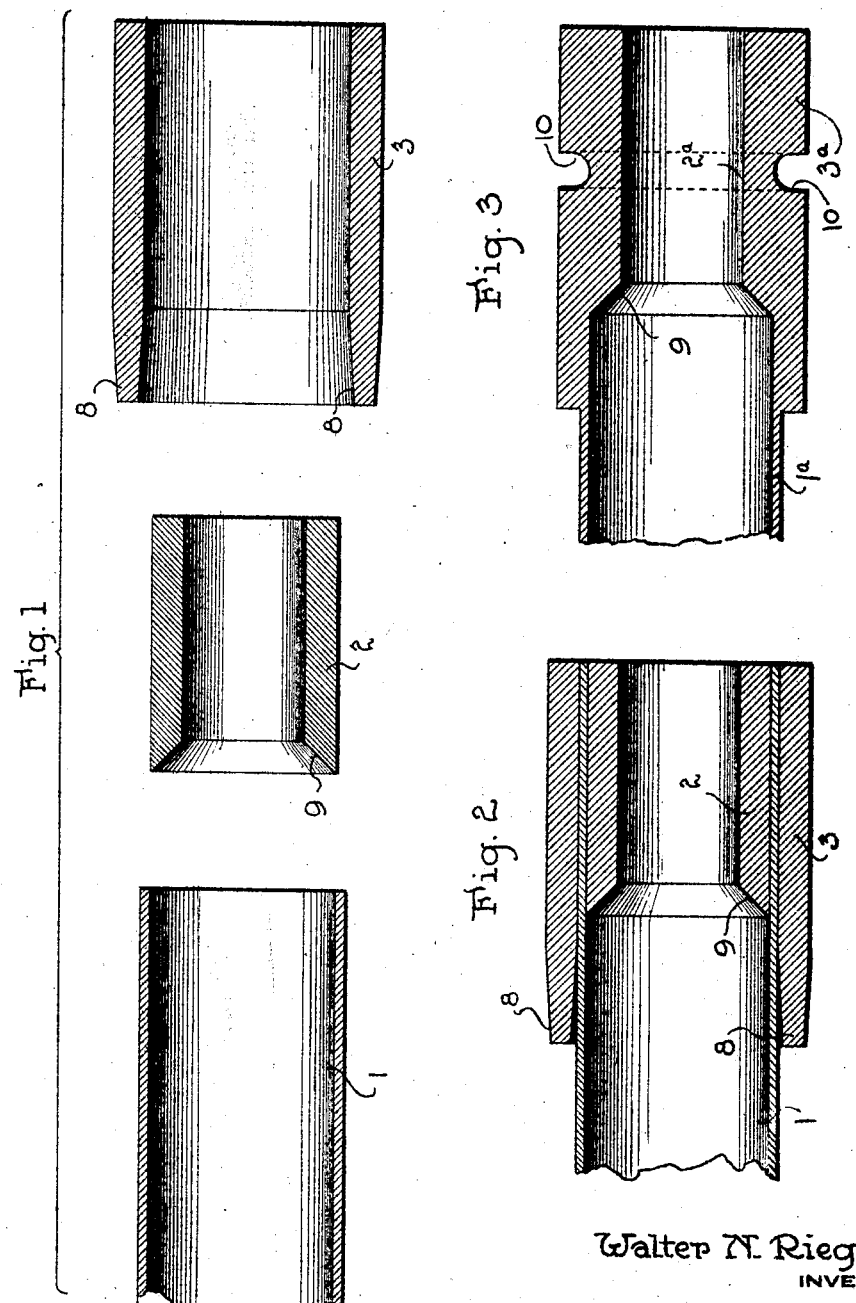
Walter N. Rieger
INVENTOR March 23, 1926. 1,577,591
W. N. RIEGER
METHOD OF FORMING PIPE COUPLINGS AND THE LIKE
Filed Dec. 16, 1922 2 Sheets-Sheet 2
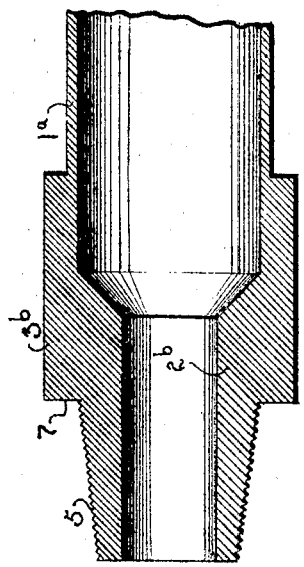
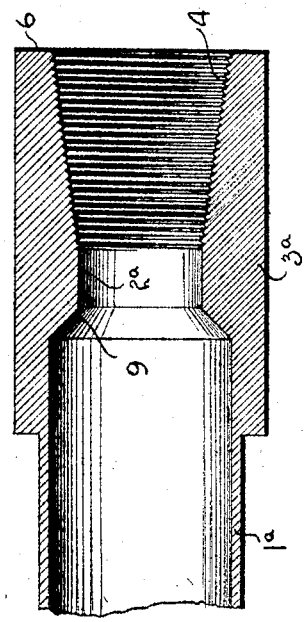
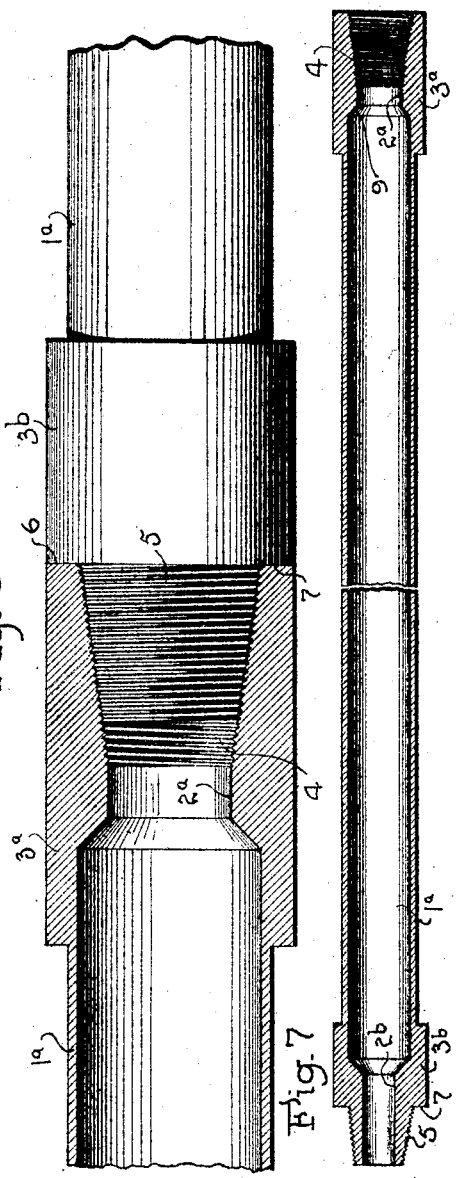
Walter N. Rieger
INVENTOR Patented Mar. 23, 1926.

1,577,591

UNITED STATES PATENT OFFICE.

WALTER NICKLES RIEGER, OF TAFT, CALIFORNIA.

METHOD OF FORMING PIPE COUPLINGS AND THE LIKE.

Application filed December 16, 1922. Serial No. 607,395.

*To all whom it may concern:*

Be it known that I, WALTER N. RIEGER, a citizen of the United States, residing at Taft, in the county of Kern and State of California, have invented new and useful Improvements in Methods of Forming Pipe Couplings and the like, of which the following is a specification.

This invention relates to a method of forming pipe couplings or tool joints, which are especially adapted to withstand rough usage and heavy strains, such as are incident to their use in deep wells and the like.

In the drilling or boring of wells, it is frequently necessary to withdraw the drilling pipe, and in so doing, it is unscrewed in sections until the whole pipe is withdrawn. Couplings or joints which connect the several sections are therefore subjected to rough usage, so that it is necessary to construct the same to withstand the strains incident to such use.

The general object of the present invention is to provide a method of constructing such joints which will render the same strong and durable, whereby to withstand the heavy service to which it is subjected and at the same time to provide a method which will involve a minimum amount of labor. The tool joints used at present render the pipe valueless for drilling purposes when the upset end is broken off, but with my method, my tool joints can be welded thereto, thereby saving the pipe.

In the accompanying drawing, which illustrates the steps of my improved method, I have shown the adjacent ends of two sections of pipe formed with integral male and female coupling elements which are adapted to be directly engaged without the use of a sleeve coupling. It will also be noted that equivalent methods are used in making both the male and the female ends, the only difference being in the final shaping and cutting the threads.

In the drawings:

Fig. 1 is a longitudinal section of the separate elements which are combined to produce a pipe end according to my improved method.

Fig. 2 is a longitudinal section of the same parts assembled preparatory to welding.

Fig. 3 is a similar view showing the same after the welding is completed and a groove formed preparatory to swaging.

Fig. 4 is a similar view of the same after it has been formed into a female coupling member.

Fig. 5 is a longitudinal section similar to Fig. 3, but showing the same formed into a male coupling member.

Fig. 6 is a view partly in section and partly in elevation, showing the adjacent ends of two sections of pipe joined together.

Fig. 7 is a longitudinal sectional view showing both ends of a section of pipe.

Referring specifically to the drawings, 1 indicates the end of a section of pipe before the coupling member is formed thereon. In carrying out my method, I provide a sleeve 2 having an outside diameter substantially equal to the inside diameter of the pipe, and a sleeve 3 longer than the sleeve 2 and having an inside diameter substantially equal to the outside diameter of the pipe. The pipe sleeves are assembled in the relation shown in Fig. 2, preparatory to welding, the end of the sleeve 3 being first tapered inside and outside as shown at 8, to prevent the pipe from being cut or crushed when the same is swaged in. The inner end of the sleeve 2 is outwardly beveled as shown at 9 for a similar purpose. The thickness of each sleeve is greater than the thickness of the pipe.

After the parts have been brought together, as shown in Fig. 2, with their outer ends flush, they are brought to a welding heat and welded and swaged into form shown in Fig. 3, the parts 1, 2 and 3 being denoted in Fig. 3 by reference characters $1^a$, $2^a$ and $3^a$, respectively. During this step in the process, the outside diameter of the member $3^a$ has been somewhat reduced, and if a male coupling member is to be made, a peripheral groove 10 is formed therein, but if a female member is to be made, no groove is formed. The coupling member may then be welded to form a female member and the threads 4 cut to a templet, as shown in Fig. 4, or it may be welded and swaged to form a male member and threaded to a templet, as shown at 5 in Fig. 5. The outside diameter of the sleeve $3^b$ is substantially the same as that of sleeve $3^a$, but in swaging the male member, the bore $2^b$ will be reduced in size so as to be about three-quarters the diameter of the bore $2^a$. The female member is left with a smooth flat end 6, and the male member with a shoulder 7, the threads 4 and 5 being so cut that the end 6 and shoulder 7 will abut when the parts are in assembled relation.

In describing my method, I have illustrated it as applied to a specific form of tool joint, but it will be apparent that the same method may be used in connection with other pipe joints, in which the members are either threaded or connected only by gaskets or packing glands. It will also be apparent that other variations may be made in the different steps of the process, and it is to be understood that the invention includes all such equivalents which come within the scope of the appended claims.

What is claimed is:—

1. The method of making a pipe coupling, which consists in assembling an inside and an outside sleeve, which are comparatively thick, with the end of the pipe, and welding the two sleeves simultaneously to the pipe, and then swaging the same.

2. The method of making a pipe coupling, which consists in assembling an inside and an outside sleeve, which are comparatively thick, with the end of the pipe, so that said sleeves present two opposed surfaces between which the pipe is held in shape, then welding and swaging the same by a substantially continuous process, and then threading the end thereof to a templet.

3. The method of making a pipe coupling, which consists in assembling an inside and an outside sleeve, which are comparatively thick, with their outer ends flush with the end of the pipe, whereby said sleeves present two opposed surfaces between which the pipe is held in shape, then welding the two sleeves and the pipe together simultaneously, and swaging them in, the inner end of the outer sleeve being first tapered to prevent shearing the pipe during the swaging.

4. The method of making a pipe coupling which consists in assembling an inside and an outside sleeve, with the outer ends thereof flush with the end of the pipe, welding the same together, swaging them in and then threading the end thereof to a templet, the inner end of the outer sleeve being first tapered inside and outside to prevent shearing the pipe during the swaging.

5. The method of making a pipe coupling, which consists in assembling an inside and an outside sleeve, which are comparatively thick with their outer ends flush with the end of the pipe, welding and swaging the same, the inner ends of the sleeves being first reduced in thickness to prevent shearing the pipe or crushing it during the swaging.

6. The method of making a pipe coupling which consists in assembling with each of the adjacent ends of the pipe an inside and an outside sleeve each of greater thickness than the pipe, with the outer ends of the sleeves flush with the ends of the pipe sections, then welding and swaging the same to form corresponding male and female members.

7. The method of making a pipe coupling which consists in assembling with each of the adjacent ends of the pipe an inside and an outside sleeve, welding said sleeves to the ends of the respective pipe sections to form adjacent ends of like shape and size, then swaging one of said ends in and the other out, and threading the same to a templet to form corresponding male and female threads.

8. The herein described method consisting in assembling a pair of sleeves, one within and one without the pipe at the end of the latter, the sleeves being of greater thickness than the pipe, with the outer ends of the sleeves and pipe flush with each other, whereby said sleeves present two opposed surfaces between which the pipe is held in shape, and then welding both sleeves simultaneously to the pipe and swaging the same.

In testimony that I claim the foregoing as my own, I have hereto affixed my signature.

WALTER NICKLES RIEGER.